Patented Dec. 12, 1950

2,533,842

UNITED STATES PATENT OFFICE 2,533,842

METHOD FOR PREPARING CHLORINE DIOXIDE GAS

Johan Waldemar Sevón and Frey Viking Sundman, Kuusankoski, Finland; Karl-Gustaf Birger Fogelholm, administrator of the estate of said Johan Waldemar Sevón, deceased, assignors to Kymin Osakeyhtio-Kymmene Aktiebolag, Kuusankoski, Finland, a company of Finland No Drawing. Application May 16, 1946, Serial No. 670,317. In Sweden March 17, 1944

Section 1, Public Law 690, August 8, 1946
Patent expires March 17, 1964

6 Claims. (Cl. 23—152)

Previously known methods for the preparations of chlorine dioxide work exclusively with more or less concentrated solutions of chlorates. Since the speed of the reaction leading to the formation of chlorine dioxide falls off very rapidly as soon as the concentration of chlorates falls during the reaction to a certain fixed value, depending on the reaction conditions, a considerable portion of the chlorate consequently remains unreacted in the reaction mixture, which residual chlorate it does not pay to utilize by continuing the reaction or to recover from the solution.

The decrease in chlorate concentration in the solution during the course of the reaction furthermore causes an ever increasing loss of yield, for with increasing dilution certain side reactions—leading either to formation of chlorine or, by direct reduction, to chloride—come more and more to the fore. This is the case particularly in the known methods for preparation of chlorine dioxide working with sulfur dioxide.

The disadvantages pointed above are eliminated by the present invention by substituting for the use of chlorate solutions that of chlorates or chlorate-chloride mixtures either in the solid form or made up into a paste, which reaction substance may further be mixed with indifferent organic or inorganic substances incapable of taking part in the reaction. The addition of such substances according to this invention brings about a "dilution" of the chlorate to replace the dilution with water, and so enables us to carry through the reactions leading to the formation of chlorine dioxide so far as to utilize the chlorate in its entirety without a simultaneous serious decrease in yield through dilution with water. In some cases it may be advantageous to add substances that take up water, thus binding also the water possibly formed during the reaction, the diluting effect of which can thus be entirely eliminated.

Since it is important for a smooth course of the reaction that the chlorate be distributed as evenly as possible throughout the reaction mixture, arrangement should be made for intensive stirring of the reaction mixture, for which purpose the reaction vessel is to be equipped with a mixer suitable to the purpose or, better yet, a mixer and grinder combination. It is to be understood that the amount of water necessary for the reaction is present at all times, and this water may often advantageously be added together with the chlorate, which is thereby given the form of a paste.

In order to avoid a baking together of the moist reaction mixture it is mixed with, for example, sand; and, for instance, gypsum or sodium sulfate may be used to bind moisture.

Particularly in the synthesis of chlorine dioxide from pure chlorates or such contaminated with chlorides by means of sulfur dioxide the process disclosed in this invention has given chlorine dioxide practically free of chlorine, while at the same time the chlorate put into the reaction was completely or substantially completely consumed while maintaining a good yield of chlorine dioxide. The process disclosed in this invention has the further advantage that the reaction may be interrupted at will by cutting off the supply of sulfur dioxide, which is not the case when solutions of chlorates are used, the reaction in solution continuing long after addition of sulfur dioxide is stopped. According to this invention it therefore becomes possible to regulate the supply of chlorine dioxide at will, as it must, for instance for bleaching purposes, be adjusted to the need.

A further advantage is that the supply of sulfur dioxide need not be so exactly adjusted to the decreasing chlorate concentration as in the case of chlorate solutions. The manifestation of sulfur dioxide in the reaction product is easy to detect and indicates that too much sulfur dioxide is being supplied.

What is claimed is:

1. A process of producing chlorine dioxide which comprises contacting a member of the group consisting of sulfur dioxide and gas mixtures containing sulfur dioxide with a chlorate containing solid in the presence of insufficient water to dissolve the chlorate, with mechanical agitation to increase the extent of contact between the gas and the solid.

2. A process of producing chlorine dioxide which comprises contacting a member of the group consisting of sulfur dioxide and gas mixtures containing sulfur dioxide with a solid chlorate blended with a solid diluent substance inert to the reaction in the presence of insufficient water to dissolve the chlorate with mechanical agitation to increase the extent of contact between the gas and the solid.

3. A process of producing chlorine dioxide which comprises contacting a member of the group consisting of sulfur dioxide and gas mixtures containing sulfur dioxide with a solid chlorate salt mixed with sand as a diluent thereof in the presence of insufficient water to dissolve the chlorate, with mechanical agitation to increase the extent of contact between the gas and the solid.

4. A process of producing chlorine dioxide which comprises contacting sulfur dioxide with a chlorate containing solid in the presence of sufficient water to form a paste thereof but insufficient to dissolve the chlorate, with mechanical agitation to increase the extent of contact between the gas and solid.

5. A process of producing chlorine dioxide which comprises contacting a member of the group consisting of sulfur dioxide and gas mixtures containing sulfur dioxide with a solid mixture of a chlorate and a material capable of taking up water formed in the reaction in the presence of insufficient water to dissolve the chlorate, with mechanical agitation to increase the extent of contact between the gas and the solid.

6. Process of producing chlorine dioxide which comprises contacting a member of the group consisting of sulfur dioxide and gas mixtures containing sulfur dioxide with a solid mixture of chlorate and inert diluents therefor in the presence of insufficient moisture to dissolve the chlorate with mechanical grinding to evenly distribute the chlorate and agitation to increase the extent of contact between the gas and the solid.

JOHAN WALDEMAR SEVÓN.
FREY VIKING SUNDMAN.

REFERENCES CITED

The following references are of record in the file of this patent:

UNITED STATES PATENTS

| Number | Name | Date |
| --- | --- | --- |
| 1,904,190 | Becker | Apr. 18, 1933 |
| 2,338,268 | Stossel et al. | Jan. 4, 1944 |

FOREIGN PATENTS

| Number | Country | Date |
| --- | --- | --- |
| 121,177 | Sweden | Jan. 22, 1948 |